United States Patent [19]

Enomoto

[11] 4,110,674

[45] Aug. 29, 1978

[54] PROGRAMMABLE FEED CONTROL APPARATUS FOR A MACHINE TOOL

[75] Inventor: Minoru Enomoto, Handa, Japan

[73] Assignee: Toyoda-Koki Kabushiki Kaisha, Japan

[21] Appl. No.: 748,272

[22] Filed: Dec. 7, 1976

[30] Foreign Application Priority Data

Jan. 30, 1976 [JP] Japan ................................ 51-9499

[51] Int. Cl.² .......................................... G05B 19/24
[52] U.S. Cl. .................................. 318/571; 318/603; 318/685
[58] Field of Search ................. 318/39, 571, 603, 611, 318/685; 235/151.11

[56] References Cited

U.S. PATENT DOCUMENTS

| | | | |
|---|---|---|---|
| 3,760,252 | 9/1973 | Beery | 318/611 |
| 3,794,900 | 2/1974 | Kobayashi et al. | 318/603 |
| 3,967,176 | 6/1976 | Wagener et al. | 318/603 |
| 3,978,454 | 8/1976 | Willard | 364/900 |
| 4,021,650 | 5/1977 | Ruble | 235/151.11 |

Primary Examiner—Robert K. Schaefer
Assistant Examiner—Eugene S. Indyk
Attorney, Agent, or Firm—Oblon, Fisher, Spivak, McClelland & Maier

[57] ABSTRACT

A programmable feed control apparatus for controlling the feed movement of a machine member in response to control data of a feed control program stored in a program memory is disclosed wherein the programmable feed control apparatus includes a flip flop which is set by completion of the generation of a set of timing pulses in order to perform a feed movement of the machine member. The flip flop is reset when the feed movement is completed in order to generate another set of timing pulses to read out the control data.

9 Claims, 3 Drawing Figures

PROGRAMMABLE FEED CONTROL APPARATUS FOR A MACHINE TOOL

BACKGROUND OF THE INVENTION

1. Field of the Invention:

The present invention relates to apparatus for controlling a machine tool, and, more particularly, a programmable feed control apparatus for digitally controlling the feed movement of a machine tool.

2. Description of the Prior Art:

In the conventional programmable feed control apparatus, a set of timing pulses is not utilized to read out the control data for the control of the feed movement of a machine tool. Therefore, in order to increase versatility, the component parts of the circuit construction have to be increased in number which results in complicated circuit construction.

Furthermore, in the conventional programmable feed control apparatus, in a normal feed control cycle, the feed amount of the machine member commanded by the control data is preset in a feed control counter. The preset value is subtracted by feed pulses generated from a feed pulse generating circuit into a drive circuit of a servo motor for moving the machine member. When the content of the feed control counter becomes zero, generation of the feed pulses is stopped. When a return command is generated for returning the machine member to a starting position, the feed pulses distributed to the drive circuit are added to or subtracted from the counted value of a return control counter for counting an accumulative moving amount of the machine member from the starting position in response to the moving direction of the machine member. The feed pulses are applied to the drive circuit until the counted value becomes zero. With this construction, a change-over of the counters is necessary either under the normal feed control cycle or at the generation of the return command which results in complicated circuit construction.

SUMMARY OF THE INVENTION

It is an object of the present invention to provide a new and improved programmable feed control apparatus which is both simple in circuit construction and versatile in operation.

Another object of the present invention is to provide a new and improved programmable feed control apparatus wherein control data stored in the program memory is read out by a set of timing pulses.

Another object of the present invention is to provide a new and improved programmable feed control apparatus of simple circuit construction which enables a machine member to return to a starting position in response to a return command.

The foregoing and other objects are attained in accordance with one aspect of the present invention through the provision of a programmable feed control apparatus for moving a machine member of a machine tool as described below. A program memory memorizes a plurality of control data for control of the feed movement of the machine member at memory addresses thereof. A program counter is operatively connected to the program memory for reading out the control data stored in the program memory. An instruction register is operatively connected to the program memory for registering the control data designated by the program counter. A first presetting element is provided for digitally presetting feed amounts through which the machine member is to be moved. A second presetting element is provided for digitally presetting feed speeds of the machine member. A feed pulse generating circuit generates a train of feed pulses. A first selector is operatively connected to the instruction register to select one of the feed amounts designated by control data registered in the instruction register. A second selector is operatively connected to the instruction register to select one of the feed speeds designated by the control data registered in the instruction register and is connected to the feed pulse generating circuit to load the selected feed speed thereinto to thereby determine the frequency of the train of pulses generated from the feed pulse generating circuit. A feed control counter is operatively connected to the first selector to be loaded with the selected feed amount and is connected to the feed pulse generating circuit to receive the train of feed pulses to subtract the content thereof. The feed control counter generates a signal when the content thereof becomes zero. A drive circuit is operatively connected to the feed pulse generating circuit to receive the train of feed pulses. A servo motor is operatively connected to the drive circuit for moving the machine member. A timing pulse generating circuit generates a set of timing pulses to enable control data stored in the program memory to be transferred.

A flip flop is provided to be set by completion of the generation of a set of timing pulses from the timing pulse generating circuit to enable the feed pulse generating circuit to generate a train of feed pulses to thereby perform a feed movement of the machine member, and to be reset by a signal from the feed control counter upon completion of the feed movement of the machine member to thereby enable the timing pulse generating circuit to generate another set of timing pulses so that further control data stored in the program memory is trnasferred, and to thereby enable the feed pulse generating circuit to stop the generation of the feed pulses.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENT

Figure 1:
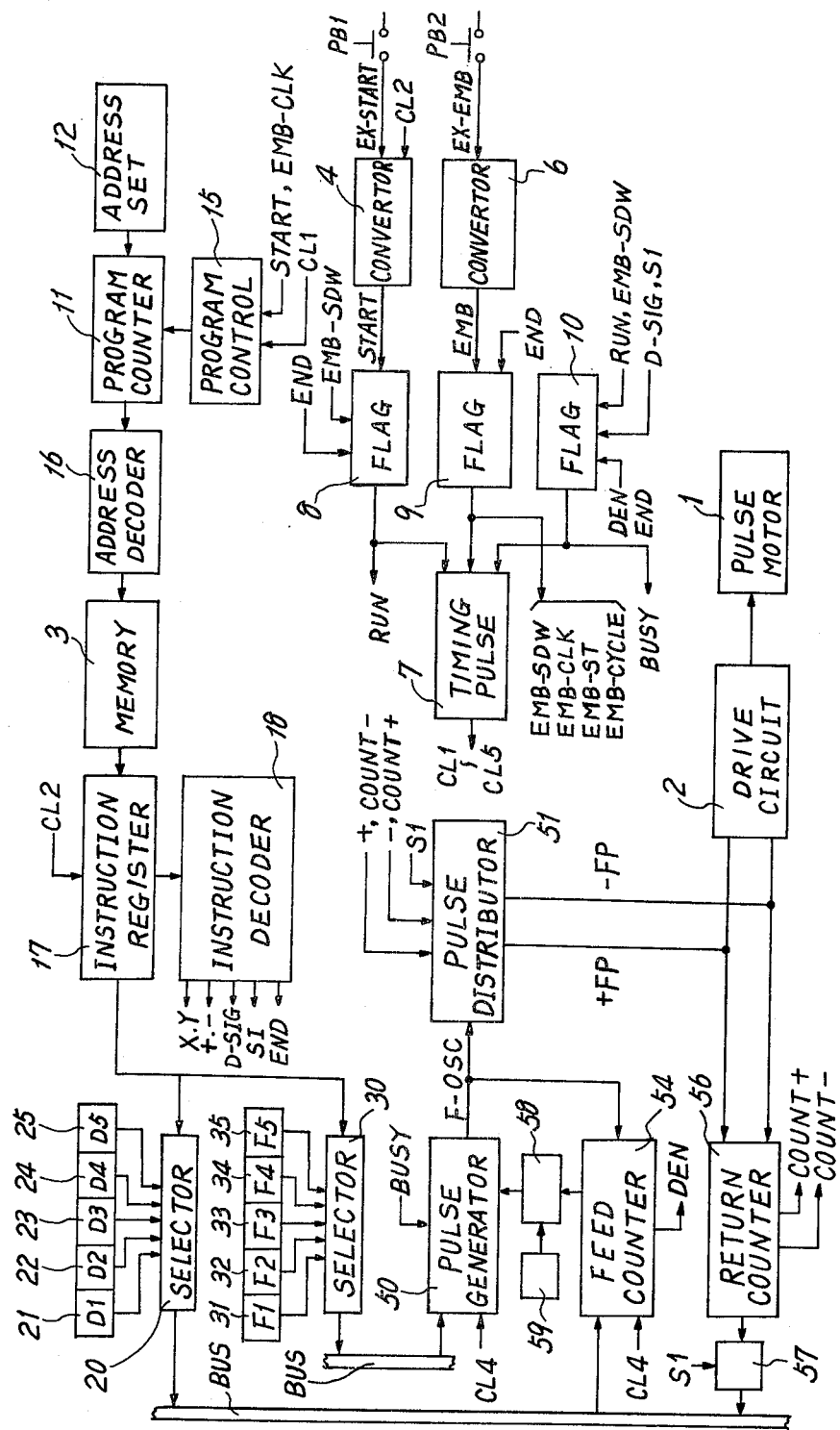
FIG. 1 is a schematic block diagram of the present invention.

Referring now to the drawings, wherein like reference numerals or characters designate identical or corresponding parts throughout the several views, and more particularly to FIG. 1 thereof, there is shown a pulse motor 1 for moving a machine member (not shown). A pulse motor drive circuit 2 is connected to the pulse motor 1 to rotate pulse motor 1 in a forward direction when receiving a train of pulses at a forward terminal thereof and to rotate pulse motor 1 in a reverse direction when receiving a train of pulses at a reverse terminal thereof.

A program memory 3, comprising a diode-matrix circuit, memorizes at its memory addresses m0 to m47 a plurality of control data or information, such as data for controlled axes X, Y, for controlled directions +, −, for digital switches D1 to D5 for presetting feed amounts, for digital switches F1 to F5 for presetting feed speeds, for miscellaneous function S1, for example, for commanding the machine member to be retracted to its starting position, and for program end END. An example of the program stored in the memory 3 for controlling a grinding machine is shown in TABLE 1. The program for a normal control cycle for the wheel support is memorized in the memory addresses m0 to m4 and the program for an emergency cycle is memorized in the memory addresses m41 and m42.

TABLE 1

| Memory Address | Control Data | Memory Address | Control Data |
|---|---|---|---|
| m0 | X+D3F5 | ∫ | |
| m1 | X+D1F1 | | |
| m2 | X+D2F2 | m41 | XF5S1 |
| m3 | X−D4F5 | m42 | END |
| m4 | END | ∫ | |
| | | m47 | |

A manually operated switch PB1 is provided to start the normal control cycle and, when depressed, to apply a signal EX-START. A signal level converting circuit 4 is connected to receive the signal EX-START and continues to generate a control signal START until a timing pulse CL2 is applied thereto. A manually operated switch PB2 is provided to start the emergency cycle and, when depressed, to apply a signal EX-EMB. A signal level converting circuit 6 is connected to receive the signal EX-EMB to generate a control signal EMB.

A timing pulse generating circuit 7 is provided to generate a train of timing pulses CL1 to CL5 in a control data reading-out cycle and to stop generation of the timing pulses CL1 to CL5 during a feed movement of the machine member. A run flag circuit 8 is provided to generate a control signal RUN during the normal control cycle. An emergency run flag circuit 9 is provided to generate control signals EMB-SDW, EMB-CLK, EMB-ST and EMB-CYCLE during the emergency cycle. A busy flag circuit 10 is provided to generate a control signal BUSY during the feed movement of the machine member.

Figure 2:
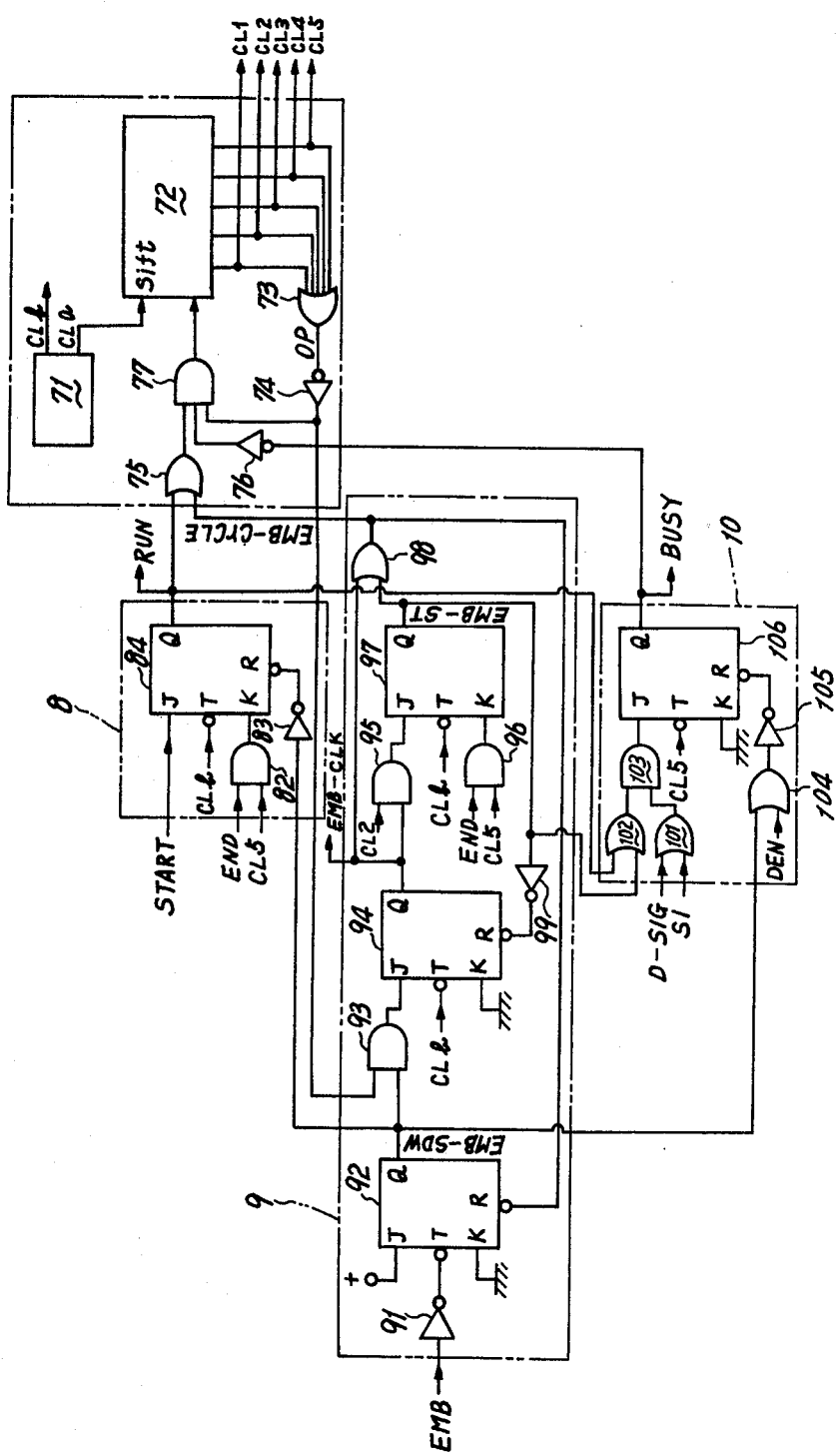
FIG. 2 is a detailed circuit diagram of the components shown in FIG. 1.

Circuits 7 to 10 are shown in more detail in FIG. 2.

Figure 3:
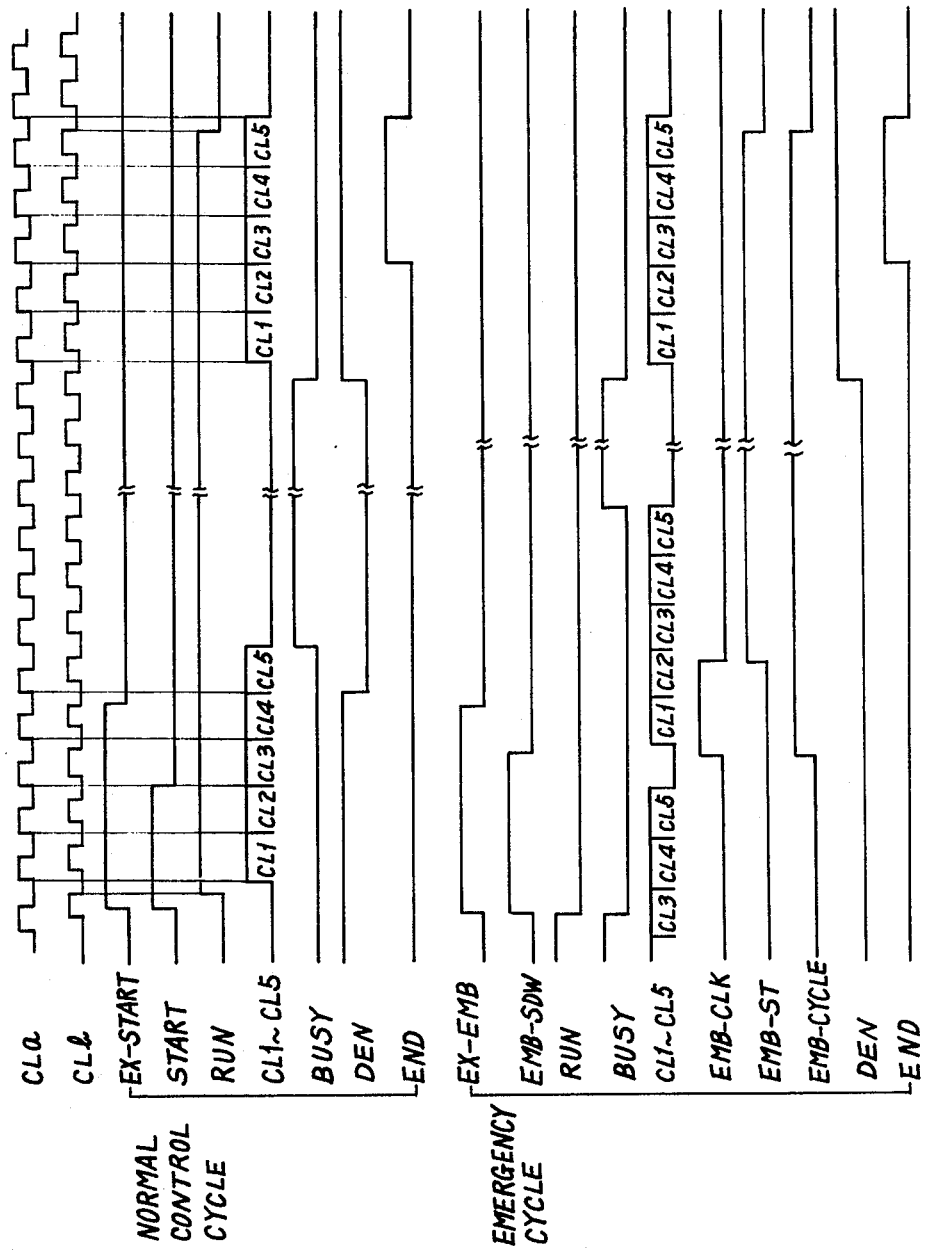
FIG. 3 shows a time chart of various timing signals.

The timing pulse generating circuit 7 comprises a clock pulse generator 71 for generating a train of clock pulses CLa and a train of clock pulses CLb whose cycle is delayed one fourth cycle from the cycle of the clock pulses CLa, as shown in FIG. 3. A shift register 72 has a shift input terminal connected to receive the clock pulses CLa. The shift register 72 generates by a shift operation a train of timing pulses CL1 to CL5 in response to the clock pulses CLa when an input signal is applied to a serial input terminal thereof. An OR gate 73 is connected at input terminals thereof to respective output terminals of the shift register 72 to generate a signal OP during generation of the timing pulses CL1 to CL5. An inverter 74 is connected to an output terminal of the OR gate 73 to receive the signal OP. An OR gate 75 is connected at input terminals thereof to receive the signal RUN from the run flag circuit 8 and the signal EMB-CYCLE from the emergency run flag circuit 9. An inverter 76 is connected to receive the signal BUSY from the busy flag circuit 10. An AND gate 77 is connected at input terminals thereof to the output terminals of the inverters 74 and 76 and the OR gate 75 and is connected at its output terminal to the serial input terminal of the shift register 72. Accordingly, the timing pulse generating circuit 7 generates a train of timing pulses CL1 to CL5 when one of the signals RUN and EMB-CYCLE is generated, but the timing pulses CL1 to CL5 and the signal BUSY are not generated.

The emergency run flag circuit 9 comprises an inverter 91 connected to receive the signal EMB from the signal level converting circuit 6. The output terminal of the inverter 91 is connected to a T terminal of a J-K type flip flop 92. A reset input terminal R of the J-K flip flop 92 is connected to receive the signal EMB-CYCLE. The flip flop 92, when set, generates a signal EMB-SDW at its set output terminal Q which is connected to an input terminal of an AND gate 93. The other input terminal of the AND gate 93 is connected to the output terminal of the inverter 74 in the timing pulse generating circuit 7. An output terminal of the AND gate 93 is connected to a J terminal of a J-K flip flop 94. A T terminal of the flip flop 94 is connected to receive the clock pulses CLb from the clock pulse generator 71. The flip flop 94, when set, generates a signal EMB-CLK at its set output terminal Q which is connected to an input terminal of an AND gate 95. The other input terminal of the AND gate 95 is connected to receive the timing pulse CL2 from the shift register 72. The output terminal of the AND gate 95 is connected to a J terminal of a J-K flip flop 97 whose T terminal is connected to receive the clock pulses CLb from the clock pulse generator 71. A K terminal of the flip flop 97 is connected to an output terminal of an AND gate 96. The input terminals of the AND gate 96 are connected to receive the program end signal END from an instruction decoder 18 and the timing pulse CL5 from the shift register 72. The flip flop 97, when set, generates a signal EMB-ST from its set output terminal Q which is connected to an input terminal of an OR gate 98. The other input terminal of the OR gate 98 is connected to the set output terminal Q of the flip flop 94 to receive the signal EMB-CLK therefrom. An inverter 99 is connected at its input terminal to the Q terminal of the flip flop 97 and is connected at its output terminal to a reset input terminal R of the flip flop 94.

Accordingly, when the signal EMB is generated from the signal level converting circuit 6, the emergency run flag circuit 9 generates the signals EMB-SDW, EMB-CLK and EMB-ST in succession, and generates the signal EMB-CYCLE during a logical OR condition of the signals EMB-CLK and EMB-ST.

The run flag circuit 8 comprises an AND gate 82 which is connected at its input terminals to receive the program end signal END from the instruction decoder 18 and the timing pulse CL5 from the shift register 72. The output terminal of the AND gate 82 is connected to a K terminal of a J-K flip flop 84. A J terminal of the flip flop 84 is connected to receive the signal START from the signal level converting circuit 4, and a T terminal thereof is connected to receive the clock pulses CLb from the clock pulse generator 71. A reset terminal R of the flip flop 84 is connected to an output terminal of an inverter 83 which is connected at its input terminal to the Q terminal of the flip flop 92 to receive the signal EMB-SDW therefrom. When the flip flop 84 is set, it generates the signal RUN from a Q terminal thereof. Accordingly, when the signal START is generated, the flip flop 84 continues to generate the signal RUN from the Q terminal thereof until one of the signals END and EMB-SDW is generated.

The busy flag circuit 10 comprises an OR gate 101 which is connected at its input terminals to receive the signals D-SIG and S1 from the instruction decoder 18. An output terminal of the OR gate 101 is connected to an input terminal of an AND gate 103. The other input terminal of the AND gate 103 is connected to an output terminal of an OR gate 102 which is connected at its input terminals to the Q terminals of the flip flops 84 and 97 to receive the signals RUN and EMB-ST therefrom. An output terminal of the AND gate 103 is connected to a J terminal of a J-K flip flop 106 whose T terminal is connected to receive the timing pulse CL5 from the shift register 72. A reset terminal R of the flip flop 106 is connected to an output terminal of an inverter 105 which is connected at its input terminal to an output terminal of an OR gate 104. The OR gate 104 is connected at its input terminals to the Q terminal of the flip flop 92 to receive the signal EMB-SDW therefrom and to receive a signal DEN from a control counter 54 which will be described hereinafter. When the flip flop 106 is set, it generates the signal BUSY from a Q terminal thereof.

Accordingly, the flip flop 106 starts to generate the signal BUSY when the timing pulse CL5 is generated during the condition that either signal EMB-ST or RUN is generated, and either signal D-SIG or S1 is generated. The flip flop 106 stops generating the signal BUSY when one of signals EMB-SDW and DEN is generated.

Referring back to FIG. 1, a program counter 11 is provided to designate a memory address of the memory 3 so that the content of the designated memory address is read out. An address setting circuit 12 connected to the program counter 11 sets therein a start address, for example m41 in TABLE 1, for starting the emergency cycle. A program control circuit 15 is connected to the program counter 11 to reset the content of the program counter to m0 when it receives the signal START and the timing pulse CL1, to load the content of the address setting circuit 12 into the program counter 11 when it receives the signal EMB-CLK and the timing pulse CL1, and to increase the content of the program counter one by one when it receives only the timing pulse CL1. An address decoder 16 is connected between the program counter 11 and the memory 3 to decode the content of the program counter 11 to thereby render operative a memory address of the memory 3 which is designated by the content of the program counter 11. An instruction register 17 is connected to the memory 3 to read out control data stored at a memory address which is rendered operative when the register 17 receives a timing pulse CL2. An instruction decoder 18 is connected to the instruction register 17 to decode the control data stored in the register 17, such as, X, Y, +, −, SI or END. The decoder 18 further generates a signal D-SIG when the control data designates D1-D5.

Digital switches 21-25 for manually presetting various feed amounts are numbered D1 to D5, respectively. A selector 20 decodes the content of the register 17 and selects one of the digital switches 21 to 25 associated with one of the numbers D1 to D5 designated by control data. Digital switches 31-35 for manually presetting various feed speeds are numbered F1 to F5 respectively. A selector 30 decodes the content of the register 17 and selects one of the digital switches 31 to 35 associated with one of the numbers F1 to F5 designated by control data.

A pulse generating circuit 50 is connected to the selector 30 through a data bus line BUS and is loaded with a selected feed speed value when a timing pulse CL4 is generated. The pulse generating circuit 50 generates a train of feed pulses F-OSC, whose frequency is dependent upon the loaded value, when the signal BUSY is applied thereto, and stops the generation of feed pulses F-OSC immediately after the signal BUSY disappears. A pulse distributing gate circuit 51 is connected to the pulse generating circuit 50 to pass the feed pulses F-OSC as forward feed pulses +FP when the signal + is generated from the decoder 18 or when the signal S1 is generated from the decoder 18 and a signal COUNT- is generated from a return control counter 56 which will be described in further detail hereinafter. The pulse distributing gate circuit 51 also passes the feed pulses F-OSC as return feed pulses −FP when the signal − is generated from the decoder 18 or when the signal S1 is generated from the decoder 18 and a signal COUNT+ is generated from the return control counter 56.

The feed control counter 54 is connected to the selector 20 through the data bus line BUS and is loaded with a selected feed amount when a timing pulse CL4 is generated. The feed control counter 54 is also connected to the return control counter 56 through the data bus line BUS and a gate circuit 57 and is loaded with the content of the return control counter 56 when the gate circuit 57 is opened in response to the signal S1. The content of the feed control counter 54 is subtracted one by one each time a feed pulse F-OSC is applied thereto from the pulse generating circuit 50. When the content of the feed control counter 54 becomes zero, the feed control counter 54 generates a signal DEN. A comparator circuit 58 compares the content of the feed control counter 54 with a predetermined value preset in a digital switch 59 and generates a match signal when the content of the feed control counter 54 coincides with the predetermined value preset in the digital switch 59 in order to gradually reduce the frequency of the feed pulses F-OSC generated from the pulse generating circuit 50. The return control counter 56 receives the forward feed pulses +FP at its addition terminal and the return feed pulses −FP at its subtraction terminal so as to count an accumulative moving amount of the moveable member from a starting position. The counter 56 generates the return signal COUNT+ when the content thereof is positive and generates the forward signal COUNT− when the content thereof is negative.

The operation of the above described embodiment will now be described with reference to the program shown in TABLE 1 for controlling a grinding machine and a time chart shown in FIG. 3.

The operator depresses the switch PB1 in order to perform a normal feed control cycle whereby the signal START is generated from the signal level converting circuit 4. The flip flop 84 of the run flag circuit 8 is set by the signal START to thereby generate the signal RUN. Under the initial condition, the flip flop 106 of the busy flag circuit 10 is maintained reset, and, thus, the signal BUSY is not generated therefrom. Accordingly, when the signal RUN is generated, the shift register 72 of the timing pulse generating circuit 7 generates a train of timing pulses CL1 to CL5 in succession. During generation of these timing pulses CL1 to CL5, one control data is read out.

The signal START having been generated, the timing pulse CL1, when generated, causes the program counter 11 to be reset to m0. When the timing pulse CL2 is generated, generation of the signal START is stopped, and, simultaneously, one control data X+D3F5 stored at the memory address m0 of the memory 3 is read out into the instruction register 17. Accordingly, the digital switch 23 numbered as D3 and the digital switch 35 numbered as F5 are selected by the selectors 20 and 30, respectively, and the decoder 18 generates the signals X, + and D-SIG.

When the timing pulse CL4 is generated, a feed amount of the digital switch 23 is preset in the feed control counter 54 through the data bus line BUS and a rapid feed speed value of the digital switch 35 is loaded into the pulse generating circuit 50 through the data bus line BUS.

When the timing pulse CL5 is generated, the flip flop 106 of the busy flag circuit 10 is set to generate the signal BUSY so that the generation of the timing pulses CL1 to CL5 is stopped. When the signal BUSY is generated, the pulse generating circuit 50 starts to generate the feed pulses F-OSC, the frequency thereof being dependent upon the value loaded therein. The signal + being generated, the feed pulses F-OSC are passed through the pulse distributing gate circuit 51 as forward feed pulses +FP. The forward feed pulses +FP are fed to the forward terminal of the pulse motor drive circuit 2 to rotate the pulse motor in a forward direction to rapidly advance the wheel support of the grinding machine.

The feed pulses F-OSC are also supplied to the feed control counter 54 to subtract the preset feed amount. When the content of the feed control counter 54 becomes equal to the value preset in the digital switch 59, the comparator circuit 58 generates a match signal to cause the pulse generating circuit 50 to gradually decrease the frequency of the feed pulses F-OSC. Therefore, the feed movement of the wheel support is gradually reduced. When the content of the feed control counter 54 becomes zero, that is, when the number of the feed pulses F-OSC generated from the pulse generating circuit 50 becomes equal to the value preset in the digital switch 23, the feed control counter 54 generates the signal DEN. With the signal DEN generated, the flip flop 106 of the busy flag circuit 10 is reset to stop generation of the signal BUSY so that the pulse generating circuit 50 stops generating the feed pulses F-OSC. Accordingly, the wheel support is rapidly advanced through the distance set by the digital switch 23.

Similar to the above operation, each time generation of the signal BUSY is stopped, the shift register 72 of the timing pulse generating circuit 7 generates a set of timing pulses CL1 to CL5 so that the content of the program counter 11 is increased one by one. Accordingly, control data stored in the memory addresses m1 and m2 are read out in succession to advance the wheel support by the feed amount set in the digital switch 21 at the feed speed set in the digital switch 31 and subsequently by the feed amount set in the digital switch 22 at the feed speed set in the digital switch 32.

When the control data stored at the memory address m3 is read out, the wheel support is rapidly retracted to the starting position through the feed amount set in the digital switch 24, which amount is equal to the sum of the feed amounts set in the digital switches 21, 22 and 23.

Finally, when the control data END stored at the memory address m4 is read out, the flip flop 84 of the run flag circuit 8 is reset, whereby the normal feed control cycle is completed.

The emergency cycle is initiated by depressing the switch PB2 when the operator detects any abnormality during the performance of the normal feed control cycle. With the switch PB2 depressed, the signal EMB is generated from the signal level converting circuit 6. The flip flop 92 of the emergency run flag circuit 9 is set through the signal EMB to generate the signal EMB-SDW. The flip flop 84 of the run flag circuit 8 is reset through the signal EMB-SDW to stop generating the signal RUN. The flip flop 106 of the busy flag circuit 10 is also reset through the signal EMB-SDW to stop generating the signal BUSY. Accordingly, generation of the signal EMB-SDW stops the normal feed control cycle which has been performed until then.

With the signal EMB-SDW generated, the flip flop 94 of the emergency run flag circuit 9 is set to generate the signal EMB-CLK immediately when the timing pulses CL1 to CL5 are being not generated from the shift register 72 of the timing pulse generating circuit 7, or after the timing pulses CL1 to CL5 will have been generated when the timing pulses are being generated. The OR gate 98 generates the signal EMB-CYCLE by means of the signal EMB-CLK. The flip flop 92 is reset by the signal EMB-CYCLE to stop generation of the signal EMB-SDW. When the generation of the signal BUSY from the busy flag circuit 10 is being stopped, the shift register 72 of the timing pulse generating circuit 7 starts to generate a set of timing pulses CL1 to CL5 by means of the signal EMB-CYCLE.

When the timing pulse CL1 is generated, the program control circuit 15 loads the content (m41) of the address setting circuit 12 into the program counter 11. When the timing pulse CL2 is generated, the control data XF5S1 stored in the memory address m41 is read out. With timing pulse CL2 generated, the flip flop 97 of the emergency run flag circuit 9 is set to generate the signal EMB-ST. The flip flop 94 is reset to stop generation of the signal EMB-CLK by means of the signal EMB-ST.

After the signal S1 is generated from the instruction decoder 18, the gate circuit 57 is opened. When the timing pulse CL4 is generated, the content of the return control counter 56, which indicates the accumulative moving amount of the wheel support from the starting position, is preset into the feed control counter 54 through the gate circuit 57 and the data bus line BUS. With the timing pulse CL4 generated, a rapid feed speed value set in the digital switch 35 is loaded in the pulse generating circuit 50.

The signals EMB-ST and S1 being generated from the flip flop 97 and the instruction decoder 18, respectively, when the timing pulse CL5 is generated, the flip flop 106 of the busy flag circuit 10 is set to generate the signal BUSY whereby the pulse generating circuit 50 generates the feed pulses F-OSC, the frequency thereof being dependent upon the value loaded therein. The signals S1 and COUNT+ being generated from the instruction decoder 18 and the return control counter 56, the feed pulses F-OSC are passed through the pulse distributing gate circuit 51 as the return feed pulses −FP.

The pulse motor 1 is rotated in a reverse direction by means of the return feed pulses −FP to retract the wheel support. While the wheel support is retracted, the preset value in the feed control counter 54 is subtracted by the feed pulses F-OSC.

When the content of the feed control counter 54 becomes equal to the value preset in the digital switch 59, the comparator circuit 58 generates the match signal to cause the pulse generating circuit 50 to gradually decrease the frequency of the feed pulses F-OSC. When the content of the feed control counter 54 becomes zero, it generates the signal DEN so that the flip flop 106 of the busy flag circuit 10 is reset to stop generating the signal BUSY. Accordingly, generation of the feed pulses F-OSC from the pulse generating circuit 50 is stopped. In this manner, the wheel support is rapidly retracted to the starting position.

When generation of the signal BUSY is stopped, a set of timing pulses are again generated. At this time, the signal EMB-ST is generated, but the signal EMB-CLK has disappeared. Therefore, when the timing pulse CL1 is generated, the content of the program counter 11 is increased one to designate the memory address m42. When the timing pulse CL2 is generated, the control data END stored in the memory address m42 is read out. Subsequently, the flip flop 97 of the emergency run flag circuit 9 is reset to complete the emergency cycle.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. A programmable feed control apparatus for moving a machine member of a machine tool comprising:
    a program memory for memorizing a plurality of control data for control of a feed movement of the machine member at memory addresses thereof;
    a program counter operatively connected to the program memory for reading out the control data stored in the program memory;
    an instruction register operatively connected to the program memory for registering the control data designated by the program counter;
    first presetting means for digitally presetting feed amounts through which the machine member is to be moved;
    second presetting means for digitally presetting feed speeds of the machine member;
    a feed pulse generating circuit for generating a train of feed pulses;
    a first selector operatively connected to the instruction register to select one of the feed amounts designated by control data registered in the instruction register;
    a second selector operatively connected to the instruction register to select one of the feed speeds designated by control data registered in the instruction register and operatively connected to the feed pulse generating circuit to load the selected feed speed thereinto to determine a frequency of the train of pulses generated from the feed pulse generating circuit;
    a feed control counter operatively connected to the first selector to be loaded with the selected feed amount and operatively connected to the feed pulse generating circuit to receive the train of feed pulses to subtract the content thereof;
    the feed control counter generating a signal when the content thereof becomes zero;
    a drive circuit operatively connected to the feed pulse generating circuit to receive the train of feed pulses;
    a servo motor operatively connected to the drive circuit for moving the machine member;
    a timing pulse generating circuit for generating a set of timing pulses to enable control data stored in the program memory to be transferred;
    a first flip flop set by completion of generation of a set of timing pulses from the timing pulse generating circuit to enable the feed pulse generating circuit to generate a train of feed pulses to perform a feed movement of the machine member and reset by the signal from the feed control counter upon completion of the feed movement of the machine member; and
    means responsive to the operation of the first flip flop for inhibiting the timing pulse generating circuit from generating another set of timing pulses while the first flip flop is set and for enabling the timing pulse generating circuit to generate the another set of timing pulses immediately after the first flip flop is reset.

2. A programmable feed control apparatus as claimed in claim 1 wherein said means responsive to the operation of the first flip flop is an inverter constituting a part of the timing pulse generating circuit and connected at an input terminal thereof to a set output terminal of the first flip flop, and wherein said timing pulse generating circuit further comprises:
    a clock pulse generating circuit for generating a train of clock pulses;
    a shift register connected at a shift terminal thereof to the clock pulse generating circuit to receive a train of clock pulses for generating a train of timing pulses at output terminals thereof;
    a first OR gate connected at input terminals thereof to the output terminals of the shift register;
    another inverter connected at an input terminal thereof to an output terminal of the OR gate; and
    a first AND gate connected at input terminals thereof to output terminals of the inverters and connected at an output terminal thereof to a serial terminal of the shift register;
    said first flip flop being connected at a reset input terminal thereof to the feed control counter to receive the signal therefrom when the content of the feed control counter becomes zero so as to be reset thereby and being connected at a trigger input terminal thereof to receive a final timing pulse among a set of timing pulses so as to be set thereby.

3. A programmable feed control apparatus as claimed in claim 2 further comprising:
    a manually operated switch for generating a start signal when it is depressed; and
    a second flip flop connected to receive the start signal to be set thereby and connected at a set output terminal thereof to a set input terminal of the first flip flop and to another input terminal of the AND gate.

4. A programmable feed control apparatus as claimed in claim 1 further comprising:
    a digital switch for manually presetting a predetermined value; and
    a comparator for comparing the content of the feed control counter with the predetermined value and for generating a match signal when the content of the feed control counter becomes equal to the predetermined value to cause the feed pulse generating circuit to gradually reduce the frequency of the feed pulses generated therefrom.

5. A programmable feed control apparatus as claimed in claim 1 further comprising:
an address setting circuit connected to the program counter for setting a start address of an emergency cycle program stored in the memory; and
a manually operated switch, when depressed, for resetting the first flip flop and for causing the start address set in the address setting circuit to be loaded into the program counter so as to perform the emergency cycle.

6. A programmable feed control apparatus as claimed in claim 5 further comprising a second flip flop connected to receive a signal from the manually operated switch to be set thereby for resetting the first flip flop and for causing the start address set in the address setting circuit to be loaded into the program counter so as to perform the emergency cycle.

7. A programmable feed control apparatus as claimed in claim 5 further comprising:
a return control counter operatively connected to the feed pulse generating circuit for counting an accumulative moving amount of the machine member from a starting position; and
a gate circuit operatively connected between the feed control counter and the return control counter for loading the content of the return control counter into the feed control counter in response to a return command of the emergency cycle program.

8. A programmable feed control apparatus as claimed in claim 3 further comprising:
an address setting circuit connected to the program counter for setting a start address of an emergency cycle program stored in the memory;
another manually operated switch for generating a signal when it is depressed;
a third flip flop connected to receive the signal from the another manually operated switch to be set thereby and connected at a set output terminal thereof to reset input terminals of the first and second flip flops;
a second AND gate connected at input terminals thereof to the set output terminal of the third flip flop and the output terminal of the first inverter;
a fourth flip flop connected to receive an output signal from the second AND gate to be set thereby for causing the start address set in the address setting circuit to be loaded into the program counter so as to perform the emergency cycle;
a fifth flip flop connected to receive an output from the set output terminal of the fourth flip flop to be set thereby and connected at a set output terminal thereof to a reset input terminal of the fourth flip flop;
a second OR gate connected at input terminals thereof to set output terminals of the fourth and fifth flip flops and connected at an output terminal thereof to a reset input terminal of the third flip flop;
a third OR gate connected at input terminals thereof to set output terminals of the second and fifth flip flops and connected at an output terminal thereof to the set input terminal of the first flip flop; and
a fourth OR gate connected at input terminals thereof to the set output terminal of the second flip flop and to the output terminal of the second OR gate and connected at an output terminal thereof to the another input terminal of the first AND gate.

9. A programmable feed control apparatus as claimed in claim 8 further comprising:
a return control counter operatively connected to the feed pulse generating circuit for counting an accumulative moving amount of the machine member from a starting position; and
a gate circuit operatively connected between the feed control counter and the return control counter for loading the content of the return control counter into the feed control counter in response to a return command of the emergency cycle program.

* * * * *